United States Patent
Wang

(10) Patent No.: US 8,600,116 B2
(45) Date of Patent: *Dec. 3, 2013

(54) VIDEO SPEED DETECTION SYSTEM

(75) Inventor: Jigang Wang, Scottsdale, AZ (US)

(73) Assignee: American Traffic Solutions, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/477,951

(22) Filed: May 22, 2012

(65) Prior Publication Data

US 2012/0229627 A1     Sep. 13, 2012

Related U.S. Application Data

(63) Continuation of application No. 13/178,471, filed on Jul. 7, 2011, now Pat. No. 8,184,863, which is a continuation of application No. 11/970,371, filed on Jan. 7, 2008, now Pat. No. 8,213,685.

(60) Provisional application No. 60/883,641, filed on Jan. 5, 2007.

(51) Int. Cl.
*G06K 9/00* (2006.01)
*G08G 1/01* (2006.01)

(52) U.S. Cl.
USPC .................. 382/107; 382/291; 340/936

(58) Field of Classification Search
USPC ......... 382/100, 103–107, 155, 168, 173, 181, 382/193, 199, 203, 209, 232, 254, 260, 274, 382/276, 286–291, 305, 312, 321; 1/1; 340/933, 937, 936; 701/32.4
See application file for complete search history.

(56) References Cited

U.S. PATENT DOCUMENTS

| 2,871,088 A | 1/1959 | Abell |
| 5,041,828 A * | 8/1991 | Loeven .................. 340/937 |

(Continued)

FOREIGN PATENT DOCUMENTS

| AU | 56300/98 | 8/1998 |
| AU | 785266 | 1/2003 |

(Continued)

OTHER PUBLICATIONS

Coifman, B. et al.; "A Real-Time Computer Vision System for Vehicle Tracking and Traffic Surveillance"; Transportation Research Part C: Emerging Technologies; Aug. 1998; vol. 6; Issue 4; pp. 271-288.

(Continued)

*Primary Examiner* — Seyed Azarian
(74) *Attorney, Agent, or Firm* — Stoel Rives LLP

(57) ABSTRACT

Multiple-object speed tracking apparatuses are disclosed, including a camera configured to capture a set of images of a monitored area (e.g., a roadway). The camera's longitudinal axis may be positioned at any viewing angle relative to a longitudinal axis of a roadway such that at least two moving objects moving on the roadway are included in a set of high or low resolution images. A computer system is configured to analyze the set of images to detect the two moving objects and substantially simultaneously determine a calculated rate of speed of at least one of the two moving objects. The computer system also provides an on-site speed calibration process for transforming locations of an image among the set of images into real-world coordinates by considering both perspective and scale of the image. An apparatus mount for at least one of either the camera or the computer system is also disclosed.

3 Claims, 16 Drawing Sheets

(56) References Cited

U.S. PATENT DOCUMENTS

| | | | |
|---|---|---|---|
| 5,381,155 A | | 1/1995 | Gerber |
| 5,509,082 A | | 4/1996 | Toyama |
| 5,734,337 A | | 3/1998 | Kupersmit |
| 5,809,161 A | * | 9/1998 | Auty et al. ............... 382/104 |
| 5,912,822 A | | 6/1999 | Davis et al. |
| 5,935,190 A | | 8/1999 | Davis et al. |
| 5,948,038 A | | 9/1999 | Daly et al. |
| 6,188,329 B1 | * | 2/2001 | Glier et al. ............... 1/1 |
| 6,240,217 B1 | | 5/2001 | Ercan et al. |
| 6,281,808 B1 | * | 8/2001 | Glier et al. ............... 340/933 |
| 6,353,678 B1 | | 3/2002 | Guo |
| 6,373,402 B1 | | 4/2002 | Mee |
| 6,389,340 B1 | * | 5/2002 | Rayner ............... 701/32.4 |
| 6,442,474 B1 | | 8/2002 | Trajkovic et al. |
| 6,546,119 B2 | * | 4/2003 | Ciolli et al. ............... 382/104 |
| 6,573,929 B1 | | 6/2003 | Glier et al. |
| 6,647,361 B1 | | 11/2003 | Laird et al. |
| 6,690,294 B1 | | 2/2004 | Zierden |
| 6,754,663 B1 | | 6/2004 | Small et al. |
| 6,760,061 B1 | | 7/2004 | Glier et al. |
| 6,950,789 B2 | | 9/2005 | Laird et al. |
| 6,970,102 B2 | * | 11/2005 | Ciolli ............... 340/933 |
| 7,333,634 B2 | | 2/2008 | McClanahan |
| 8,134,693 B2 | | 3/2012 | Ciolli |
| 8,184,863 B2 | | 5/2012 | Wang |
| 8,213,685 B2 | | 7/2012 | Wang |
| 8,284,996 B2 | | 10/2012 | Winkler |
| 2002/0054210 A1 | | 5/2002 | Glier et al. |
| 2002/0060640 A1 | | 5/2002 | Davis et al. |
| 2002/0140577 A1 | | 10/2002 | Kavner |
| 2004/0222904 A1 | | 11/2004 | Ciolli |
| 2010/0128127 A1 | | 5/2010 | Ciolli |

FOREIGN PATENT DOCUMENTS

| | | |
|---|---|---|
| CH | 365899 | 11/1962 |
| CH | 365899 A | 11/1962 |
| DE | 2211462 | 3/1973 |
| DE | 2211462 A1 | 3/1973 |
| DE | 9214498 | 1/1993 |
| DE | 44 34 131 A1 | 3/1996 |
| EP | 0741377 | 8/1999 |
| EP | 1744292 | 1/2007 |
| GB | 504935 | 5/1939 |
| GB | 2342800 | 4/2000 |
| WO | WO97/33262 | 9/1997 |
| WO | WO01/91353 | 11/2001 |
| WO | WO02/082400 | 10/2002 |
| WO | WO2004/100102 | 11/2004 |
| WO | WO2007/036873 A3 | 4/2007 |

OTHER PUBLICATIONS

Gardel, A. et al.; "Detection and Tracking Vehicles Using a Zoom Camera Over a Pan and Tilt Unit"; Intelligent Vehicle Symposium; Jun. 17, 2002; vol. 1; IEEE; USA; pp. 215-220.

Wei-Khing For, et al.; "A multi-camera collaboration framework for real-time vehicle detection . . . "; Intelligent Vehicle Symposium; Jun. 4, 2008; pp. 192-197; IEEE; USA.

www.chronline.com; The Chronicle Online; "I-5 Ticketing Cameras to Be Activated by Month's End"; Eric Schwartz; Sep. 6, 2008.

www.thenewspaper.com; "Speed Camera Vendors Engage in All-Out Battle"; Aug. 20, 2008.

International Search Authority; International Search Report on PCT/US2008/050415; Sep. 8, 2008.

USPTO; Office Action on U.S. Appl. No. 11/970,371; mailed Mar. 25, 2011.

American Traffic Solutions, Inc.; Office Action Response on U.S. Appl. No. 11/970,371, filed Sep. 26, 2011.

USPTO; Office Action on U.S. Appl. No. 11/970,371; mailed Oct. 31, 2011.

American Traffic Solutions, Inc.; Office Action Response on U.S. Appl. No. 11/970,371, filed Jan. 31, 2012.

U.S. District Court for the Eastern District of Missouri; Docket Report for Case No. 4:13-CV-00229-AGF; available from https://ecf.moed.uscourts.gov, accessed Apr. 8, 2013.

American Traffic Solutions, Inc.; Complaint (without Exhibits), Case No. 4:13-CV-00229-AGF; available from https://ecf.moed.uscourts.gov, Oct. 18, 2012.

American Traffic Solutions, Inc.; Motion for Preliminary Injunction (with Exhibits); Case No. 4:13-CV-00229-AGF; available from https://ecf.moed.uscourts.gov; Oct. 18, 2012.

B&W Sensors LLC; Response in Opposition re Motion for Preliminary Injunction (with Exhibits); Case No. 4:13-CV-00229-AGF; available from https://ecf.moed.uscourts.gov; Dec. 14, 2012.

American Traffic Solutions, Inc.; Reply to Response in Opposition re Motion for Preliminary Injunction (with Exhibits); Case No. 4:13-CV-00229-AGF; available from https://ecf.moed.uscourts.gov; Dec. 21, 2012.

B&W Sensors LLC; Sur-Reply to Reply to Response in Opposition re Motion for Preliminary Injunction (with Exhibits); Case No. 4:13-CV-00229-AGF; available from https://ecf.moed.uscourts.gov; Dec. 31, 2012.

B&W Sensors LLC; Answer to Complaint; Case No. 4:13-CV-00229-AGF; available from https://ecf.moed.uscourts.gov; Mar. 5, 2013.

American Traffic Solutions, Inc.; Answer to Counterclaim; Case No. 4:13-CV-00229-AGF; available from https://ecf.moed.uscourts.gov; Mar. 29, 2013.

American Traffic Solutions, Inc. and B&W Sensors LLC; Joint Claim Construction Chart; Case No. 4:13-CV-00229-AGF; available from https://ecf.moed.uscourts.gov; Apr. 5, 2013.

"Traffic Detector Handbook: Third Edition—vol. I," U.S. Department of Transportation, Federal Highway Administration, Oct. 2006, 291 pgs, Publication No. FHWA-HRT-06-108, Research, McLean, VA.

Rota, Nathaneal et al., "Video Sequence Interpretation for Visual Surveillance," Proceedings of the Third IEEE International Workshop on Visual Surveillance, 2000, pp. 1-9.

Rhodes, Avery et al., "Evaluation of the Accuracy of Stop Bar Video Vehicle Detection at Signalized Intersections," Transportation Research Record: Journal of the Transportation Research Board, No. 1925, 2005, pp. 134-145.

Owens, Jonathan et al., "Application of the Self-Organising Map to Trajectory Classification," Proceedings of the Third IEEE International Workshop on Visual Surveillance, 2000, pp. 1-7.

Stein, G. et al., "Monitoring Activities from Multiple Video Streams: Establishing a Common Coordinate Frame," Massachusetts Institute of Technology, A.I. Memo No. 1655, Apr. 1999, 23 pgs.

Final Evaluation Report, "Traffic Safety Camera Pilot Project," City of Seattle, Dec. 2007, 16 pgs.

Ferrier, N. J. et al., "Real-Time Traffic Monitoring," Proceedings of the 2nd IEEE Workshop on Applications of Computer Vision, Dec. 1994, pp. 81-88.

Gloyer, Brian et al., "Video-based Freeway Monitoring System Using Recursive Vehicle Tracking," SPIE Proceedings, vol. 2421, Mar. 23, 1995, pp. 173-180.

Norris, Clive, "Video Charts Algorithmic Surveillance," Criminal Justice Matters, vol. 20, No. 1, Summer 1995, pp. 7-8.

Menon, Arvind, "Sensor Fusion for Real-time Gap Tracking and Vehicle Trajectory Estimation at Rural Intersections," MS Thesis, the University of Minnesota, Minneapolis and St. Paul, May 2005, 137 pgs.

B&W Sensors LLC: Defendant's Motion for Judgment on the Pleadings Against Plaintiff on Counts III and IV; filed Apr. 17, 2013, case in 4:13-cv-00229-AGF.

B&W Sensors LLC: Memorandum of Law in Support of Defendant's Motion for Judgment on the Pleadings Against Plaintiff on Counts III and IV; filed Apr. 17, 2013, case in 4:13-cv-00229-AGF.

American Traffic Solutions, Inc.: Plaintiff's Response in Opposition to Defendant's Motion for Partial Judgment on the Pleadings; filed Apr. 29, 2013, case in 4:13-cv-00229-AGF.

"Red Light Camera/Video System Technical Proposal," American Traffic Solutions, Anne Arundel County, Maryland, RFP No. 05-073R, Redacted, Jun. 1, 2005, Version 2.0.

(56) References Cited

OTHER PUBLICATIONS

American Traffic Solutions, Inc.: Declaration of Jigang Wang in Support of Plaintiffs Opening Claim Construction Brief; filed May 1, 2013, case in 4:13-cv-00229-AGF.
"Speed-Measuring Device Performance Specifications: Across-the-Road-Radar-Module," U.S. Department of Transportation, National Highway Traffic Administration, DOT HS 810 845, Oct. 2007.
American Traffic Solutions, Inc.: Declaration of Nathan C. Brunette in Support of Plaintiffs Opening Claim Construction Brief, with Exhibits 1-2, filed May 1, 2013, case in 4:13-cv-00229-AGF.
B&W Sensors LLC: B&W's Opening Claim Construction Memorandum, with Exhbitis 9-12 and 14-17, filed May 1, 2013, case in 4:13-cv-00229-AGF.
B&W Sensors LLC: Defendant's Reply in Support of its Motion for Judgment on the Pleadings Against Plaintiff on Counts III and IV; filed May 9, 2013, case in 4:13-cv-00229-AGF.
B&W Sensors LLC: B&W's Responsive Claim Construction Memorandum, Redacted; filed May 9, 2013, case in 4:13-cv-00229-AGF.
American Traffic Solutions, Inc.: Plaintiff's Responsive Claim Construction Brief, Redacted; filed May 9, 2013, case in 4:13-cv-00229-AGF.
American Traffic Solutions, Inc.: Declaration of Steven E. Klein in Support of Plaintiffs Responsive Claim Construction Brief, Redacted; filed May 9, 2013, case in 4:13-cv-00229-AGF.
American Traffic Solutions, Inc.: Declaration of Steven E. Klein in Support of Plaintiffs Motion for Preliminary Injunction, Redacted; filed May 13, 2013, case in 4:13-cv-00229-AGF.
American Traffic Solutions, Inc.: Plaintiffs Opening Supplemental Brief in Support of Motion for Preliminary Injunction, Redacted; filed May 13, 2013, case in 4:13-cv-00229-AGF.
B&W Sensors LLC: Defendant's Opposition to Plaintiffs Motion for Preliminary Injunction, Redacted; filed May 14, 2013, case in 4:13-cv-00229-AGF.
American Traffic Solutions, Inc.: Response Declaration of Steven E. Klein in Support of Plaintiff's Motion for Preliminary Injunction, Redacted; filed May 28, 2013, case in 4:13-cv-00229-AGF.
American Traffic Solutions, Inc.: Supplemental Declaration of Jigang Wang in Support of Plaintiff's Preliminary Injunction Motion, Redacted; filed May 28,2013, case in 4:13-cv-00229-AGF.
American Traffic Solutions, Inc.: Plaintiff's Supplemental Response Brief in Support of Motion for Preliminary Injunction, Redacted; filed May 28, 2013, case in 4:13-cv-00229-AGF.
B&W Sensors LLC: Defendant's Response in Opposition to Plaintiffs Supplemental Preliminary Injunction Brief, Redacted; filed May 29, 2013, case in 4:13-cv-00229-AGF.
American Traffic Solutions, Inc.: Plaintiff's Motion to Strike Exhibits 11 Through 16 to Defendant's Supplemental Preliminary Injunction Response and Motion for Expedited Hearing Thereon; filed Jun. 3, 2013, case in 4:13-cv-00229-AGF.
American Traffic Solutions, Inc.: Declaration of Brian C. Park in Support of Plaintiff's Motion to Strike; filed Jun. 3, 2013, case in 4:13-cv-00229-AGF.
American Traffic Solutions, Inc.: Plaintiff's Opening Claim Construction Brief, filed May 1, 2013, case in 4:13-cv-00229-AGF.

* cited by examiner

VIDEO SPEED DETECTION SYSTEM

RELATED APPLICATIONS

This application is a continuation of U.S. patent application Ser. No. 13/178,471, filed Jul. 7, 2011, entitled "VIDEO SPEED DETECTION SYSTEM"; which is a continuation of U.S. patent application Ser. No. 11/970,371, filed Jan. 7, 2008, entitled "VIDEO SPEED DETECTION SYSTEM"; which claims priority under 35 U.S.C. §119(e) to U.S. Provisional Patent Application No. 60/883,641, filed Jan. 5, 2007 entitled "NTS ViDAR™ Speed System"; each of which is hereby incorporated by reference herein in its entirety.

TECHNICAL FIELD

This disclosure relates generally to measurement of vehicle speeds and, more particularly, to a system and method for measuring vehicle speeds using video sensing.

BACKGROUND INFORMATION

The traditional approach to speed limit enforcement involves police officers observing the traffic and then chasing, stopping, and issuing citations to drivers who speed. The more modern approach to speed enforcement involves the use of a speed measuring device for measuring vehicle speeds and triggering a high speed camera to take photographs of speeding vehicles. The recorded photographs are then used to identify the registered vehicle owners or actual drivers of offending vehicles, to whom citations would be issued. Regardless of the approach adopted, the ability to provide accurate vehicle speed measurements is crucial for any speed law enforcement device. A number of methods exist for measuring vehicle speeds.

VASCAR, which stands for "visual average speed computer and recorder," is an average speed calculator that measures and displays vehicle speed based on the time a target vehicle takes to travel a known distance. Due to its semi-manual operation nature, the accuracy of VASCAR is subject to human errors and is often challenged in court.

Inductive loop sensors are commonly used to detect the presence/absence of a vehicle based on the inductance changes caused by movements of a vehicle in the vicinity of the loop sensors. There are several systems that attempt to measure the speed of a vehicle by analyzing the waveforms of the output signal as the detected vehicle passes the sensor. One simple method is to use two inductive loops and calculate vehicle speeds by measuring the distance between the two loops and the difference in the time of detection of the vehicle at the two loops. For inductive loops to work, the sensors have to be placed beneath the road surface. Therefore the requirement to close lanes of traffic for installation, and cost of installation, can make them undesirable under certain circumstances.

RADAR, which stands for "radio detection and ranging", is the technology that uses electromagnetic radio waves to detect moving vehicles and measure their speeds. A radar gun can be used to aim a beam of radio waves of a specific frequency at a vehicle and receive the returned signal as it is reflected off the target vehicle. The relative speed of the source of the emitted electromagnetic signal and the target vehicle causes the frequency of the returned signal to shift, which is known as the Doppler Effect. The magnitude of the Doppler shift is proportional to the relative speed between the source and the target vehicle. Therefore, the speed of a target vehicle can be inferred by comparing the frequency of the reflected signal to that of the emitted signal. Although radar is accurate in determining the speeds of relatively isolated vehicles, it is less effective at differentiating various vehicles in a cluttered environment, due to the relatively large beam size. In addition, radio signals can be easily detected by radar detectors. Therefore, drivers can use radar detectors to detect the presence of radar speed measuring devices and slow down temporarily to avoid being ticketed.

An alternative technology, LiDAR, uses pulsed laser light instead of radio waves to measure vehicle speeds. A LiDAR device can aim a pulsed narrow beam of light at a target vehicle and measure the time it takes to receive the reflected signal. Knowing the speed of light, the range of the target vehicle can be calculated. If the laser pulse is applied continuously and the target vehicle is moving, the range will change with time and the difference in time it takes the transmitted signal to strike the target and return can be used to measure the speed of the target vehicle. The laser beam is much narrower compared to the beam width of radar systems. Therefore, LiDAR can pinpoint to a particular target and is also more difficult to detect.

It is crucial in speed law enforcement that vehicle speeds obtained by speed measuring devices are accurate and credible. It is typically recommended that speed measuring devices undergo certain rigorous testing and certification procedures to ensure their accuracy and compliance to defined specifications. In addition, personnel that operate speed measuring devices are usually required to receive proper training on the correct operation of the devices. However, even with all the precautious procedures to ensure proper functioning of speed measuring devices in place, measurement errors are unavoidable due to the intrinsic limitations associated with each speed measuring method.

SUMMARY OF THE DISCLOSURE

As discussed above, in modern automated speed law enforcement, a speed measuring device is often supplemented with enforcement cameras that take photographs of speeding vehicles. The device measures vehicle speeds and triggers the enforcement camera(s) to take photographs of vehicles traveling above a predetermined speed limit However, while the recorded photographs can be used to identify the registered owner or even the driver of the offending vehicle, they cannot be used to reproduce the speed of the vehicle based on which the citation is issued. Therefore, it is of immense advantage to have a system that is not only capable of accurately measuring vehicle speeds in real time but also is capable of reproducing the vehicle speeds from recorded video evidence.

Accordingly, aspects and embodiments are directed to a system that can both accurately measure vehicle speeds in real time and reproduce the vehicle speeds either manually or automatically from the recorded video evidence. According to one embodiment, the system comprises a tracking camera and a processing unit. The tracking camera is capable of generating accurately time-stamped images of the monitored road and streaming them to the processing unit at a high frame rate. The processing unit processes each frame it receives from the tracking camera to detect and identify moving vehicles, and continues to track the detected vehicles through subsequent frames until the vehicles exit the tracking camera's field of view. According to one embodiment, the system allows an operator to mark four reference points on the road surface to define a parallelogram zone. It then establishes the projective mapping between image coordinates and real-world coordinates from the four point correspondences.

While the system tracks detected vehicles as they pass through the monitored road segment, it keeps updating the vehicles' position information by projecting their image coordinates back into real-world coordinates, and extracts time information from the date and time stamp associated with each image frame. The system then calculates a vehicle's speed by dividing the distance the vehicle travels by the time it spends to cover the corresponding distance. As a vehicle exits the monitored zone, the system compares its exit speed to the trigger speed set by the operator and triggers the tracking camera to record a video clip showing the vehicle entering and leaving the camera's field of view. In addition, the system can trigger supplemental high-resolution cameras to take photographs of the speeding vehicle so that the registration or driver information of the vehicle can be obtained. With the recorded time-stamped video clip, the speed of a vehicle can be reproduced using the same algorithm offline, or a speed estimate can be generated manually from the time-stamped video using the basic time-over-distance method.

According to one embodiment, a system for monitoring vehicles or other objects, may comprise a tracking camera constructed and arranged to provide a plurality of time stamped images of a measurement area, and a processing unit, coupled to the tracking camera, that is configured to receive the time stamped images and to process the images to determine from the time-stamped images a speed of a vehicle passing through the measurement area. In one embodiment, the system may further comprise a high resolution camera coupled to the processing unit that is configured to capture an image of the vehicle in response to a signal from the processing unit. In one example, the processing unit is configured to print date, time, speed, and a reticule targeted at the vehicle to the image from the high resolution camera. In another example, the processing unit is configured to receive a trigger speed value from a user of the system. The processing unit may be configured to compare the speed of the vehicle to the trigger speed and to send a trigger signal to the high resolution camera when the vehicle speed exceeds the trigger speed. In another example, the system may further comprise a storage device, and the processing unit may be further configured, in combination with the storage device, to record the time-stamped images of a vehicle whose speed exceeds the trigger speed as this vehicle travels though the measurement area. The system may be further constructed and arranged to record time-stamped images of the vehicle passing through the measurement area, and the processing unit may be further configured to receive the recorded time-stamped images of the vehicle and determine the speed of the vehicle from the recorded time-stamped images.

In another example, the processing unit may be further configured to provide a graphical user interface (GUI) to the user of the system. The GUI may be configured to receive the actual dimension of the measurement area from a user of the system. The GUI may be also configured to provide live video of the measurement area from the tracking camera. In one example, the processing unit may be is configured to continuously update the speed of a vehicle and to display the speed of the vehicle at the position of the vehicle in the video. In another example, the GUI may be further configured to display the recorded time stamped images of a vehicle. The processing unit may be further configured to allow the user of the system to step through the recorded images and determine the frames at which a vehicle passes two reference lines separated with a known distance. In addition, the processing unit may be further configured to determine the speed of a vehicle from the distance between the two reference lines and the difference in the time stamps of the frames at which the vehicles pass the two reference lines.

In another example, the processing unit may be further configured to construct rectified images of the measurement area from the plurality of time-stamped images. The rectified images of the measurement area may be constructed by determining a projective mapping from four point correspondences. In one example, the processing unit may be further configured to map coordinates of at least one of the plurality of time-stamped images to actual coordinates of the measurement area using projective mapping. In another example, the processing unit may be further configured to extract a background image of the measurement area from the plurality of time-stamped images. In one example, the background image may be extracted by temporal median filtering of the plurality of time-stamped images. The processing unit may be further configured to detect and identify vehicles within the measurement area. In one example, the processing unit may be configured to detect the vehicles by segmenting the rectified image and determining large deviations in the rectified image.

In another example, the tracking camera may be configured to provide the images at a frequency of at least 15 frames per second. In another example, the processing unit may further comprise an optical character recognition (OCR) component configured to determine the time stamp from each image of the plurality of time-stamped images. Furthermore, the processing unit may be configured to determine a distance the vehicle has traveled between two time-stamped images. In one example, the processing unit may be configured to continually determine the speed of the vehicle between two time-stamped images as vehicle travels through the measurement area. In another example, the processing unit may be configured to monitor multiple vehicles in the measurement area and measure their speeds simultaneously. In another example, the processing unit may be further configured to collect traffic statistics of the measurement area including any of number of vehicles passed through and average vehicle speed.

According to another embodiment, a method of traffic monitoring may comprise acts of collecting a plurality of time-stamped images of a monitored area; analyzing the plurality of time-stamped images to detect an object moving through the monitored area; and determining a speed of the object. In one example, the monitored area may include a section of a road and the object may be a vehicle.

According to another embodiment, a method of monitoring vehicles or other objects may comprise acts of obtaining a plurality of time-stamped images of a measurement area, and processing the plurality of time-stamped images to determine from the time-stamped images a speed of a vehicle passing through the measurement area. The method may further comprise capturing a high resolution image of the vehicle. In one example, the method may further comprise printing date, time, speed, and a reticule targeted at the vehicle to the high resolution image. In another example, the method may further comprise receiving an input trigger speed value. In addition, the method may comprise comparing the speed of the vehicle to the trigger speed and sending a trigger signal to a high resolution camera to obtain the high resolution image when the vehicle speed exceeds the trigger speed. In another example, the method may further comprise storing the plurality of time-stamped images of a vehicle whose speed exceeds the trigger speed as the vehicle travels though the measurement area.

In one example, the method may further comprise receiving recorded time-stamped images of the vehicle; and determining the speed of the vehicle from the recorded time stamped images. In another example, the method may further comprise receiving the actual dimension of the measurement area from a user via a graphical user interface (GUI). In another example, the method may further comprise displaying live video of the measurement area via a graphical user interface (GUI). The method may further comprise continuously updating the speed of a vehicle and displaying the speed of the vehicle at the position of the vehicle in the video. In another example, the method may further comprise displaying recorded time-stamped images of the vehicle via a graphical user interface (GUI). The method may further comprise allowing a user to step through the recorded time-stamped images and determine the frames at which the vehicle passes two reference lines separated by a known distance. In addition, the method may comprise determining the speed of the vehicle from the distance between the two reference lines and the difference in the time stamps of the frames at which the vehicle passes the two reference lines.

In another example, the method may further comprise constructing rectified images of the measurement area from the plurality of time-stamped images. In one example, constructing the rectified images may include determining a projective mapping from four point correspondences. In another example, the method may further comprise mapping coordinates of at least one of the plurality of time-stamped images to actual coordinates of the measurement area using projective mapping. In another example, the method may further comprise extracting a background image of the measurement area from the plurality of time-stamped images. In one example, extracting the background image includes extracting the background image by temporal median filtering of the plurality of time-stamped images. Furthermore, the method may detect and identify vehicles within the measurement area. In one example, detecting the vehicles includes segmenting at least one of the rectified images and determining large deviations in the at least one rectified image. In another example, the method may further comprise determining the time stamp from each image of the plurality of time-stamped images using an optical character recognition (OCR) component. The method may also comprise determining a distance the vehicle has traveled between two time-stamped images. In another example, the method may further comprise continually determining the speed of the vehicle between two successive time-stamped images as vehicle travels through the measurement area. In yet another example, the method may comprise monitoring multiple vehicles in the measurement area and measuring their speeds simultaneously. In another example, the method may also comprise collecting traffic statistics of the measurement area including any of a number of vehicles passed through and average vehicle speed.

Additional aspects and advantages will be apparent from the following detailed description of preferred embodiments, which proceeds with reference to the accompanying drawings.

BRIEF DESCRIPTION OF THE DRAWINGS

Aspects and embodiments of this disclosure are described in detail below with reference to the accompanying drawings. It is to be appreciated that the drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF EMBODIMENTS

Figure 1:
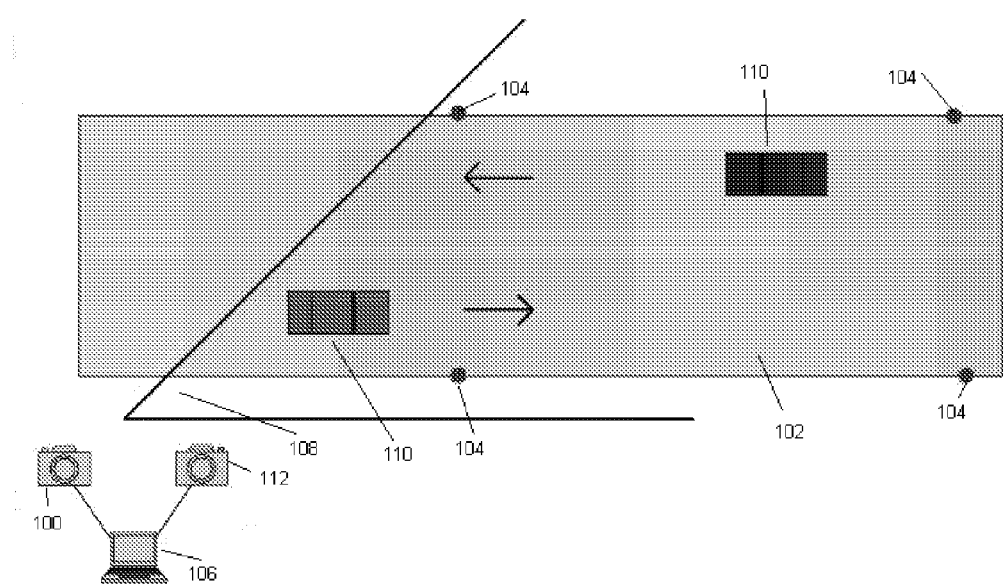
FIG. 1 is a schematic block diagram of one example of a system according to aspects of the present disclosure.

This disclosure is not limited in its application to the details of construction and the arrangement of components set forth in the following description or illustrated in the drawings. The disclosure is capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. In addition, it is to be appreciated that the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

FIG. 1 is a schematic block diagram illustrating one example of a typical setup of a system for speed measuring and enforcement, according to aspects of the present disclosure. In the illustrated embodiment, the system comprises a tracking camera 100 aimed at a segment of road 102, and a processing unit 106 coupled to the tracking camera 100. In the example illustrated in FIG. 1, the processing unit 106 is represented as a computer. However, it is to be appreciated that the processing unit may be any type of processor capable of running software and communicating with the tracking camera 100 and, optionally, an enforcement camera 112. The monitored segment of the road 102 is defined by four retro-reflective markers 104 placed along both sides of the road 102 so as to define an area on the road surface. In one example, the area is a rectangle, as illustrated. The following discussion will refer primarily to a rectangular monitored area; however, it is to be appreciated that the present disclosure is not so limited and the markers 104 may be used to define an area shaped other than as a rectangle. The width and length of the rectangle are measured and used as camera calibration parameters, as discussed further below. The tracking camera 100 has a field of view 108, and generates images with accurate time stamps at a predefined frame rate. According to one embodiment, a software engine running on the processing unit 106 retrieves images transmitted from the tracking camera 100. The software engine may allow the processing unit 106 to display the transmitted images live in a graphic user interface (GUI). The software engine may also analyze the images to detect moving vehicles 110 in field of view 108 of the tracking camera 100, and may calculate the speeds of the vehicles in real time.

The tracking camera 100 is not limited to any particular design or architecture. Any off-the-shelf camera that can deliver high quality images of the monitored road may be used. In a presently preferred embodiment, the camera should deliver the images at a minimum of 15 frames per second. To achieve high accuracy in speed measurement and legal credibility in court, in one embodiment it is recommended that the camera has the capability of generating highly accurate time stamps and inserting them into the images. Alternatively, other timing devices may be used to generate accurate timing information associated with each image frame. In another embodiment, the time at which the processing unit 106 receives each individual frame may be used as the time stamp. However, due to the unpredictable delay that may occur in the transmission process, the receiving time may exhibit greater variation than the time at which individual image frames are generated. Therefore, speed measurements obtained this way may be less accurate. Of course, the more accurate the time stamps, the more accurately the speed of the vehicle 110 can be calculated. Therefore, very accurate time stamps may be advantageous for at least some applications. Higher frame rates will also help improve the accuracy of the calculated speeds. Accordingly, in one example, the tracking camera 100 generates 30 images per second and each image is time-stamped to one one-hundredth of a second.

Referring again to FIG. 1, in one embodiment the system also includes an enforcement camera 112. The enforcement camera 112 maybe supplemental to the speed measuring components of the system, and may be used only for taking photographs of speeding vehicles so that registration or driver information can be obtained for enforcement purposes. According to one embodiment, characteristics of the enforcement camera 112 include that it can be triggered by signals from the processing unit 106 to take photos of the speeding vehicle 110, and that the image quality of the camera allows for identification of, for example, the registration number of the vehicle 110 or the driver's image, as may be required for enforcement purposes.

Figure 2:
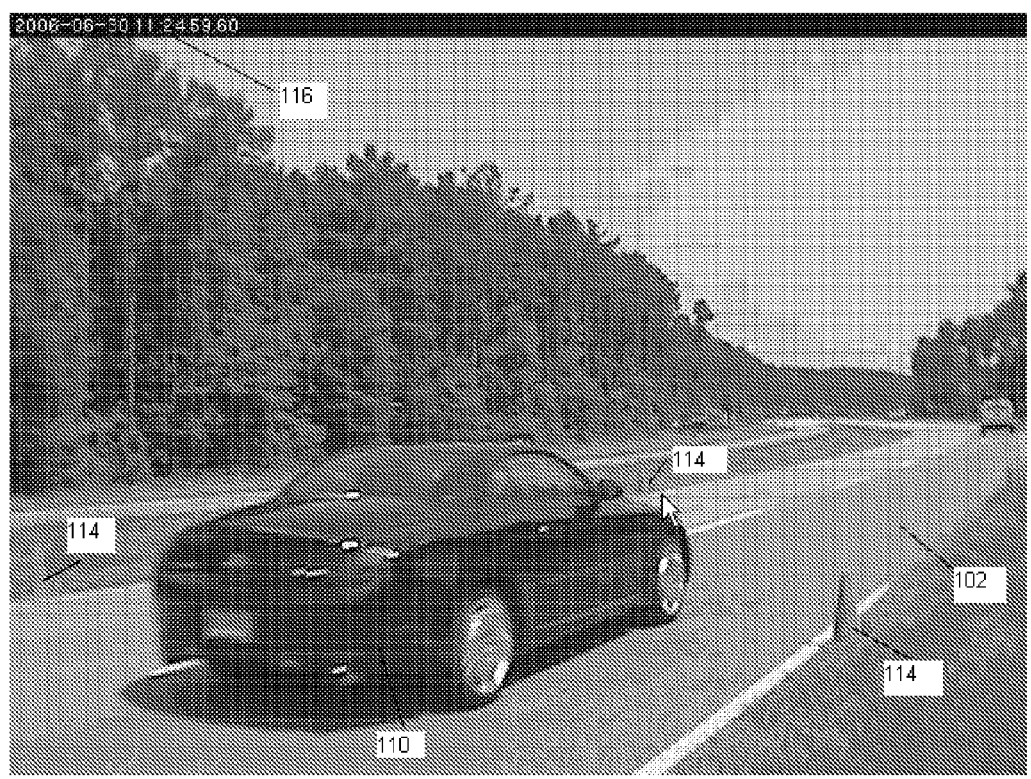
FIG. 2 is an example of a typical field of view from a tracking camera.

Referring to FIG. 2, there is illustrated an example of a typical tracking camera field of view when the system is used for vehicle speed measuring and enforcement in a mobile setup. In FIG. 2, the four cones 114 represent the four reference points (equivalent to markers 104 in FIG. 1) that define a rectangular region along the road 102. As discussed above, the width and length of the road segment defined by the cones 114 are measured and entered into the software engine for calibration of the tracking camera. The date and time stamp 116 can be found at the upper-left corner of the image in FIG. 2, and marks the time of the image frame to a specified resolution, for example one one-hundredth of a second. In one embodiment, for example, when the system is used for measuring vehicle speeds in a fixed setup, the tracking camera can be mounted on a pole or overhead master arm to achieve better resolution and field of view.

According to one embodiment, the system includes a software engine that runs on the processing unit 106 (see FIG. 1) to perform image processing, speed calculation, triggering, and video recording. As discussed above, the processing unit 106 is not limited to any particular design or architecture. The processing unit can be a laptop, a desktop or single-board computer (SBC) that is integrated with the rest of the system. In one embodiment, the processing unit includes basic peripheral devices such as memory, hard drive, Ethernet and/or other I/O communication ports to run the software engine and to interface with the cameras and the user. Depending on the interface, the cameras can be connected to the processing unit through, for example, an Ethernet router, a USB port or other ports. The whole system can be powered up by an external power adapter or by an internal battery. In one embodiment, a Kontron JRex-PM single board computer (SBC) is used for the processing unit 105. In one example, the SBC is equipped with an Intel Celeron 800 MHz processor and supplied with 512 MB RAM and 40 GB hard drive. However, the present disclosure is not limited to these examples and other processors that are capable of running the system software engine and interfacing with the cameras can be adapted for the same purpose.

Figure 3:
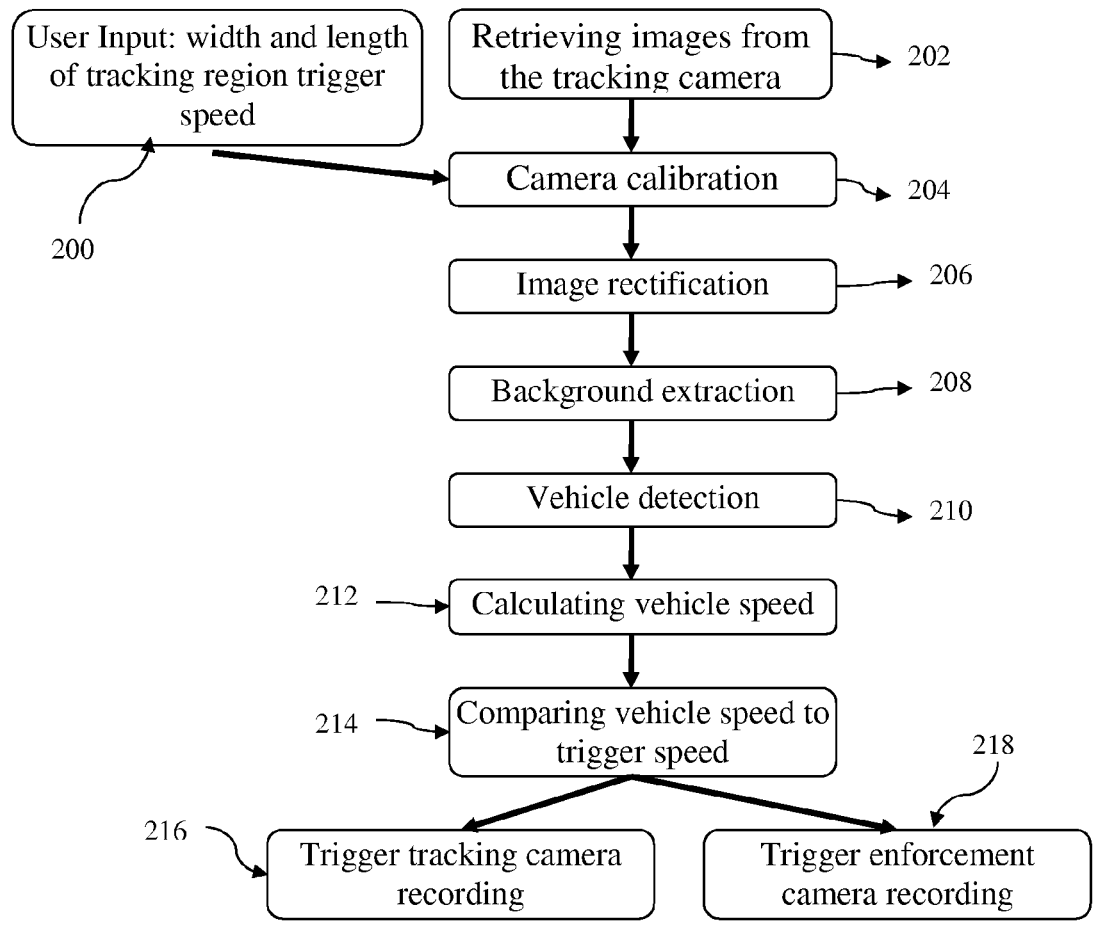
FIG. 3 is a flowchart of one example of a method for measuring vehicle speeds and photo enforcement, according to aspects of the present disclosure.

According to one embodiment, the software engine retrieves images from the tracking camera, processes the images to detect and identify vehicles in the predefined zone, and calculates speeds of detected vehicles. Referring to FIG. 3, there is illustrated one example of a logical flow diagram for operation of the software engine. Aspects and embodiments of a vehicle speed detection and enforcement system according to the present disclosure are discussed below with continuing reference to FIG. 3.

As discussed above, in a first step 200, a user may enter the length and width of the monitored area (step 200). The dimensions of the monitored area are used to define reference points that enable the software engine to correlate points in the images captured by the tracking camera with points on the actual road surface, as discussed below.

By definition, the average speed of a vehicle can be calculated based on the time over-distance method:

$$\text{Speed} = \frac{D}{T} \tag{1}$$

where D is the distance the vehicle travels and T is the time it takes to travel the distance. Therefore, in order to calculate the speed of a vehicle, one may measure how much distance the vehicle has traveled in a certain amount of time. With each image frame from the tracking camera being accurately time stamped, the time lapse T between two arbitrary frames can be easily calculated as $$T = T_2 - T_1 \quad (2)$$

where $T_1$ and $T_2$ are the respective time stamps associated with the two image frames. While it is relatively easy to measure T based on the time stamp in each image frame from the tracking camera, it is difficult to measure the distance that a vehicle has traveled during the time interval T. Any uncertainty in the measurements of time and distance will be reflected in the uncertainty in the speed estimate according to the following equation:

$$\Delta \text{Speed} = \sqrt{\left(\frac{\Delta D}{T}\right)^2 + \left(\frac{D}{T}\right)^2 \left(\frac{\Delta T}{T}\right)^2} \quad (3)$$

For example, if the time is accurate up to $\frac{1}{100}$ of a second, i.e., $\Delta T = 0.01$ sec, for a vehicle that travels at 40 MPH along 50 feet of distance, the uncertainty in the vehicle position measurements needs to be less than 0.9 feet in order for the error in speed to stay below +/−1 MPH.

To measure the distance D that a vehicle has traveled within time T from video, the system needs to know the displacement of a reference point of the target vehicle during the time interval, assuming the reference point remains motionless relative to the target vehicle. In other words, given the pixel coordinate (u, v) of a reference point, the system needs to know its real-world coordinate (x, y) relative to some pre-defined origin. Under the assumption of a pinhole camera, the transformation between image and real-world coordinates is a projective mapping. The general form of a two-dimensional projective mapping is a rational linear mapping:

$$x = \frac{au + bv + c}{gu + hv + i}, \quad y = \frac{du + ev + f}{gu + hv + i} \quad (4)$$

Although there are nine coefficients in the above mapping, it can be assumed that i=1 without loss of generality for practical purposes. Hence, there are only eight degrees of freedom in the two-dimensional projective mapping, and these eight coefficients can be determined from the image coordinates and real-world coordinates of the four vertices of a quadrilateral. Let us denote the image and real-world coordinates of the four vertices of a quadrilateral as $(u_k, v_k)$ and $(x_k, y_k)$, respectively, for k=0, 1, 2, 3. Assuming i=1, the eight coefficients can be determined by solving the following set of linear equations:

$$\begin{pmatrix} u_0 & v_0 & 1 & 0 & 0 & 0 & -u_0 x_0 & -v_0 x_0 \\ u_1 & v_1 & 1 & 0 & 0 & 0 & -u_1 x_1 & -v_1 x_1 \\ u_2 & v_2 & 1 & 0 & 0 & 0 & -u_2 x_2 & -v_2 x_2 \\ u_3 & v_3 & 1 & 0 & 0 & 0 & -u_3 x_3 & -v_3 x_3 \\ 0 & 0 & 0 & u_0 & v_0 & 1 & -u_0 y_0 & -v_0 y_0 \\ 0 & 0 & 0 & u_1 & v_1 & 1 & -u_1 y_1 & -v_1 y_1 \\ 0 & 0 & 0 & u_2 & v_2 & 1 & -u_2 y_2 & -v_2 y_2 \\ 0 & 0 & 0 & u_3 & v_3 & 1 & -u_3 y_3 & -v_3 y_3 \end{pmatrix} \begin{pmatrix} a \\ b \\ c \\ d \\ e \\ f \\ g \\ h \end{pmatrix} = \begin{pmatrix} x_0 \\ x_1 \\ x_2 \\ x_3 \\ y_0 \\ y_1 \\ y_2 \\ y_3 \end{pmatrix} \quad (5)$$

The inverse mapping from real-world coordinates (x, y) to image coordinates (u, v) is also of a rational linear form and the coefficients can be similarly determined. If more than four point correspondences can be established, the two linear equations from each point correspondence can be stacked up, and the resulting set of linear equations will be over-determined. In this case, the coefficients can be determined by solving the over determined linear system using the singular-value-decomposition (SVD) method. In the most general case, according to Equation 5, the image to real-world mapping, and its inverse, can be established from four point correspondences, i.e., from the pixel and real-world coordinates of four points in general position.

In an outdoor traffic law enforcement scenario, however, much of difficulty lies in measuring the real-world coordinates of the reference points. In general, it is much easier to measure the distance between points than to measure their absolute x and y coordinates relative to some predefined origin. To circumvent the difficulty and to take advantage of the fact that traffic lanes are usually drawn in parallel, in one embodiment, four points that define a parallelogram on the road surface are used instead of four arbitrary points that define a general quadrilateral. Therefore, as discussed above, the system can operate with only two pairs of reference markers placed along each side of the road (or lane) with the same distance. In one currently preferred embodiment, the two pairs of markers are arranged to define a rectangle on the road surface, i.e., the two sides of the parallelogram across the road are perpendicular to the direction of travel. This arrangement not only greatly simplifies the physical measurement procedure, but also simplifies the determination of the projective mappings. However, it is to be appreciated that a strict rectangle is not required for validity of the following derivation, and the present disclosure is not limited to the use of a rectangle.

Figure 4:
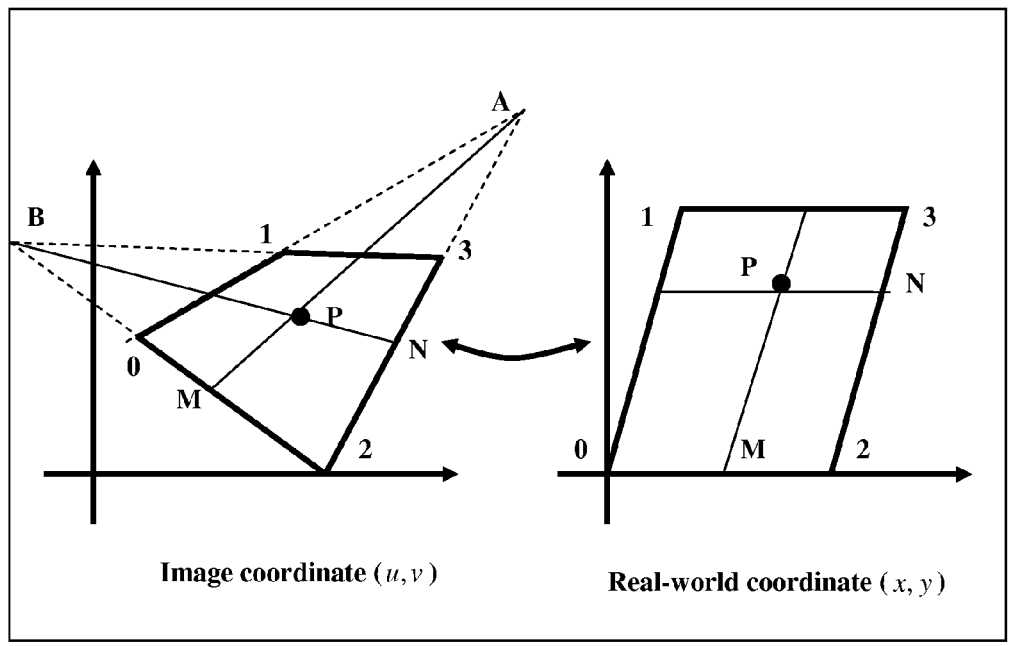
FIG. 4 is an illustration of a two-dimensional projective mapping between image and real-world coordinates, according to aspects of the present disclosure.

According to one embodiment, by making use of vanishing points, the projective mappings can be derived from pure geometrical constructions. Referring to FIG. 4, there is illustrated a two-dimensional projective mapping between the image and real-world coordinates. In the real-world space, as shown in the right plot, the four points define a parallelogram, i.e. $\overline{01} = \overline{23}$ and $\overline{02} = \overline{13}$. The left plot shows the projected points in the image space. As can be seen from the figure, the four points generally do not form a parallelogram. Let us define point A to be the intersect point of lines 01 and 23, and point B to be the intersect point of lines 02 and 13. In the real-world space, two lines are drawn parallel to the two sides 02 and 23 of the parallelogram, these lines intersecting at points M and N respectively. The two corresponding projected lines are shown in the left image space. The projective mappings can be easily derived from the following equations for points on the lines 01 and 02 respectively:

$$\frac{u_0 - u}{u - u_A} = \left(\frac{y_P - y_0}{y_1 - y_0}\right)\left(\frac{u_0 - u_1}{u_1 - u_A}\right) \quad (6)$$

$$\frac{v_0 - v}{v - v_A} = \left(\frac{y_P - y_0}{y_1 - y_0}\right)\left(\frac{v_0 - v_1}{v_1 - v_A}\right) \quad (7)$$

$$\frac{u_0 - u}{u - u_B} = \left(\frac{x_P - x_0}{x_2 - x_0}\right)\left(\frac{u_0 - u_2}{u_2 - u_B}\right) \quad (8)$$

$$\frac{u_0 - u}{u - u_B} = \left(\frac{x_P - x_0}{x_2 - x_0}\right)\left(\frac{u_0 - u_2}{u_2 - u_B}\right) \quad (9)$$

Figure 5:
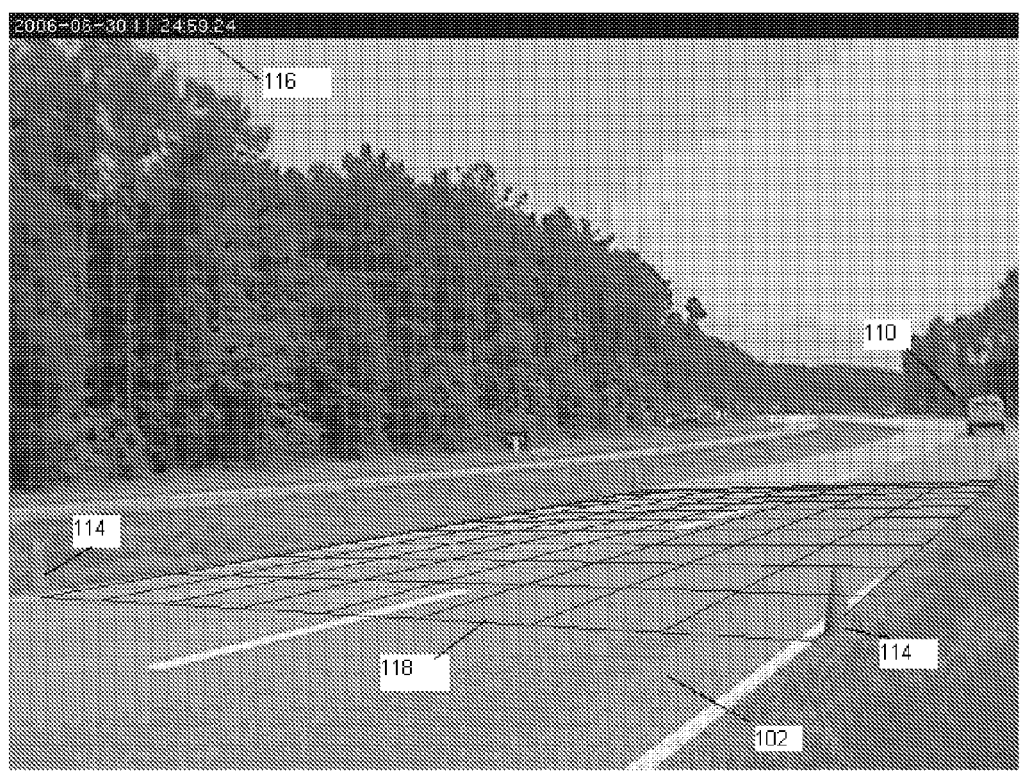
FIG. 5 is an illustration of a rectangle grid projected and overlaid to the image of the road, according to aspects of the present disclosure.

Projective mappings for points on the lines 23 and 13 can be similarly derived. For general points that do not fall on the sides of the quadrilaterals, their coordinates can be inferred by intersecting lines that connect points on the sides of the quadrilaterals, using computational techniques known to those skilled in the art. FIG. 5 illustrates a projective mapping by projecting a rectangular grid 118 on the road 102 to the image space, and overlaying it onto the road surface.

Figure 6A:
FIG. 6A is an example of an image captured by the tracking camera showing a vehicle on a section of road defined by reference markers, according to aspects of the present disclosure.
Figure 6B:
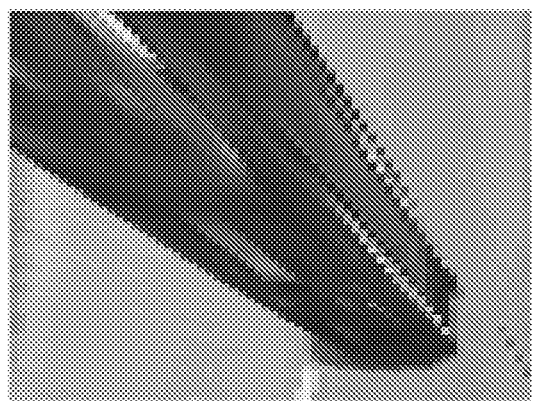
FIG. 6B is an example of a corresponding rectified image of the road surface defined by the reference markers.

Referring again to FIG. 3, in step 204 the tracking camera is calibrated. In the camera calibration step 204, the system establishes a one-to-one correspondence between each pixel and its real-world position on the road surface. Therefore, for each image the software engine retrieves from the tracking camera, it is possible to reconstruct the parallelogram region defined by the four reference markers 104 on the road 102 (see FIG. 1). In one embodiment, a rectification process (step 206) samples the parallelogram at a specified scale along both directions in the real-world space. In one example, this sampling scale is 0.5 feet. After the image coordinates are determined from the projective mapping, pixels in the image at the projected coordinates are sampled, for example, using a Gaussian filter, to represent the corresponding points on the road. Referring to FIG. 6A, there is illustrated a random frame from the tracking camera showing a vehicle 110 in the tracking zone. FIG. 6B illustrates a rectified image from the random sample image of FIG. 6A, showing the projection of the vehicle onto the road surface. According to one embodiment, the rectified images contain only pixels that correspond to the marked road surface in the original images. Each pixel in the rectified images may also bear geometrical information. For example, each pixel may represent a 0.5 feet by 0.5 feet patch on the road plane. Therefore, distance between two arbitrary pixels in the rectified images can be easily calculated.

To be able to calculate vehicle speeds, the system needs first to detect and identify moving vehicles from the images retrieved from the tracking camera. In one embodiment, detection of moving vehicles is achieved by performing segmentation on the rectified images. The segmentation algorithm generates and maintains a background image (step 208) of the road that represents the road surface without any moving object. At each frame, it then compares the currently retrieved image to the background image and identifies pixels with large deviations as foreground pixels. The resulting binary images from the segmentation algorithm, which consist of foreground and background pixels, are called object masks. Typically, foreground pixels caused by moving objects form connected regions in the object mask images. This information can be used to detect moving vehicles (step 210). Depending on whether vehicles are approaching or receding from the camera, the front or rear of foreground regions can be chosen as reference points for the underlying moving vehicles and tracked during subsequent frames for speed measurement until they exit the rectified images.

There have been many methods and techniques developed for background extraction and motion detection. These methods range from the simplest frame differencing method, to median filtering, and to the more involved Mixture of Gaussian estimation method. These methods are well explored in the computer vision field. They differ in computational complexity and performance under challenging environments and could all be used in the video speed detection system according to aspects of the present disclosure for segmenting motion pixels from the background. In one example, a recursive approximation of the temporal median filtering algorithm is used for background extraction (step 208) due to its low computational complexity and robustness provided by the non-linear filtering. The algorithm can be described as follows:

Background Extraction Algorithm: (10)

Initialization:

for each pixel $x$:

$M_0(x) = I_0(x)$ $\Delta_0(x) = 0$ $V_0(x) = 0$

Figure 7A:
FIG. 7A is an illustration of an example background image, according to aspects of the present disclosure.
Figure 7B:
FIG. 7B is an illustration of an object mask, corresponding to the image of FIG. 7A, segmenting the foreground and background pixels, according to aspects of the present disclosure.

For each frame $t$:

for each pixel $x$:

if $M_{t-1}(x) < I_t(x)$, $M_t(x) = M_{t-1}(x) + 1$ if $M_{t-1}(x) > I_t(x)$, $M_t(x) = M_{t-1}(x) - 1$ $\Delta_t(x) = |M_t(x) - I_t(x)|$ for $\Delta t(x) \neq 0$ if $\Delta_{t-1}(x) < N \times \Delta_t(x)$, $V_t(x) = V_{t-1}(x) + 1$ if $\Delta_{t-1}(x) > N \times \Delta_t(x)$, $V_t(x) = V_{t-1}(x) - 1$ if $\Delta_{t-1}(x) < V_t(x)$, $D_t(x) = 0$ if $\Delta_{t-1}(x) > V_t(x)$, $D_t(x) = 1$ Where $I_t(x)$ is the rectified image at frame t, $M_t(x)$ is the estimated rectified background image, $\Delta_t(x)$ is the absolute difference between $I_t(x)$ and $M_t(x)$, $V_t(x)$ is the estimated variance, and $D_t(x)$ is the object mask. At each frame t and pixel x, the difference $\Delta_t(x)$ is compared to the variance $V_t(x)$ to determine whether or not the pixel belongs to a foreground object. If the difference $\Delta_t(x)$ is significant compared to the variance $V_t(x)$, the pixel is classified as foreground, i.e., $D_t(x)=1$. Otherwise, the pixel is classified as background. FIG. 7A illustrates an example of the background image, $M_t(x)$, and FIG. 7B illustrates an example of the corresponding object mask, $D_t(x)$, with white pixels representing the foreground and black pixels representing the background. The input image corresponds to the frame shown in FIG. 6A. Notice that the vehicle is missing from the background image (FIG. 7A) but is correctly detected in the object mask (FIG. 7B).

After the image segmentation step, pixels that correspond to foreground objects are identified. According to one embodiment, the system then further analyzes the image strip for each individual lane to detect possible moving vehicles and identify their positions. On each row of the rectified object mask, it counts the maximum number of consecutive foreground pixels to see if the number exceeds a certain threshold value. A row is marked as a foreground row, meaning it is occupied by moving objects, if the maximum number of consecutive foreground pixels exceeds the threshold. Otherwise it is designated as a background row. This process is repeated separately for each lane. At the end of this process, each lane will be converted into a one-dimensional object mask with each item corresponding to a row in the original two-dimensional rectified image. Next, a one-dimensional median filtering can be applied to each one-dimensional array to eliminate isolated foreground and background pixels.

The system can detect presence of moving vehicles in each lane from the corresponding 1D array (step 210). This may be done by finding chunks of elements in the array that correspond to foreground objects. In one embodiment, after the chunks are isolated and identified, their lengths are computed and compared to a threshold so that segments with extremely small lengths are removed because they are likely result from noise rather than from genuine moving objects.

Referring again to FIG. 7A, it is easy to see that a large portion of the left lane is classified as foreground pixels due to projection of the vehicle from the right lane. If left uncorrected, this could lead to false object detection in the left lane. The problem can be resolved by checking the shape around the front or rear end of the identified foreground object. The object mask caused by a genuine moving vehicle will have a flat front or rear end, such as shown in the right lane of the image in FIG. 7B. On the other hand, there is no flat end in the left lane due to the nature of projection.

With moving vehicles detected at each frame, their corresponding speeds can be easily calculated (step 212) by dividing the distance they have traveled since the first time they are detected by the corresponding time that has elapsed. For example, if a vehicle is first detected by the system at frame $t_0$ at position $(x_0, y_0)$, and at frame t it is detected at $(x_t, y_t)$, the average speed of the vehicle between $t_0$ and t can be calculated as:

$$V(t) = \frac{\sqrt{(x_1 - x_0)^2 + (y_1 - y_0)^2}}{t - t_0} \quad (11)$$

Figure 8A:
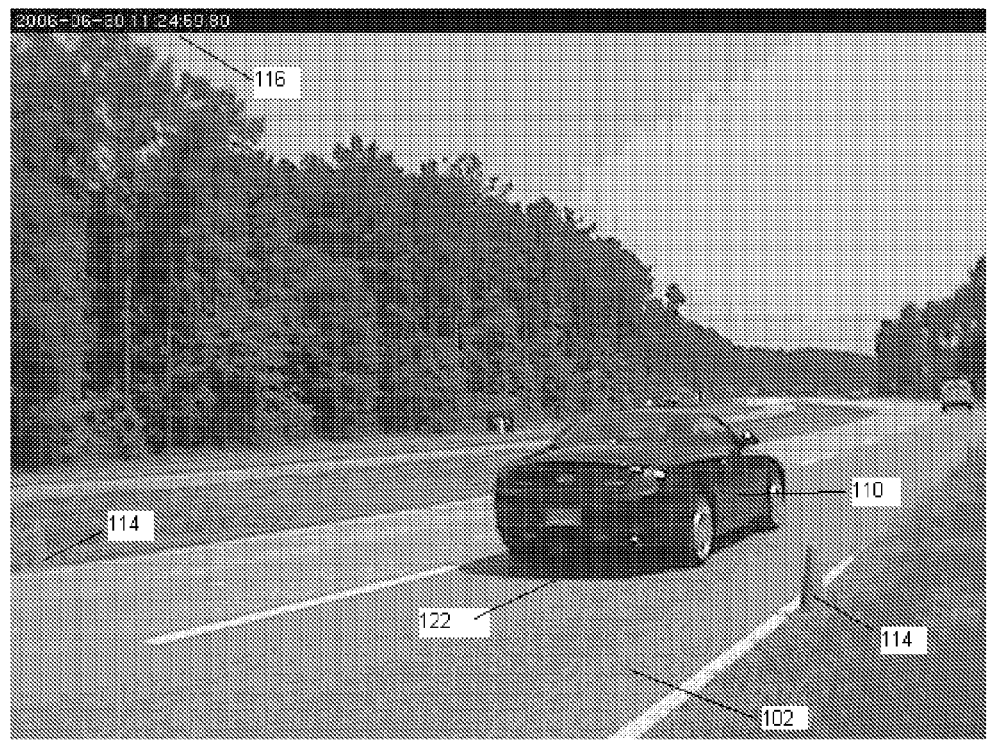
FIG. 8A is an example of an image frame of a vehicle entering a monitored road segment.
Figure 8B:
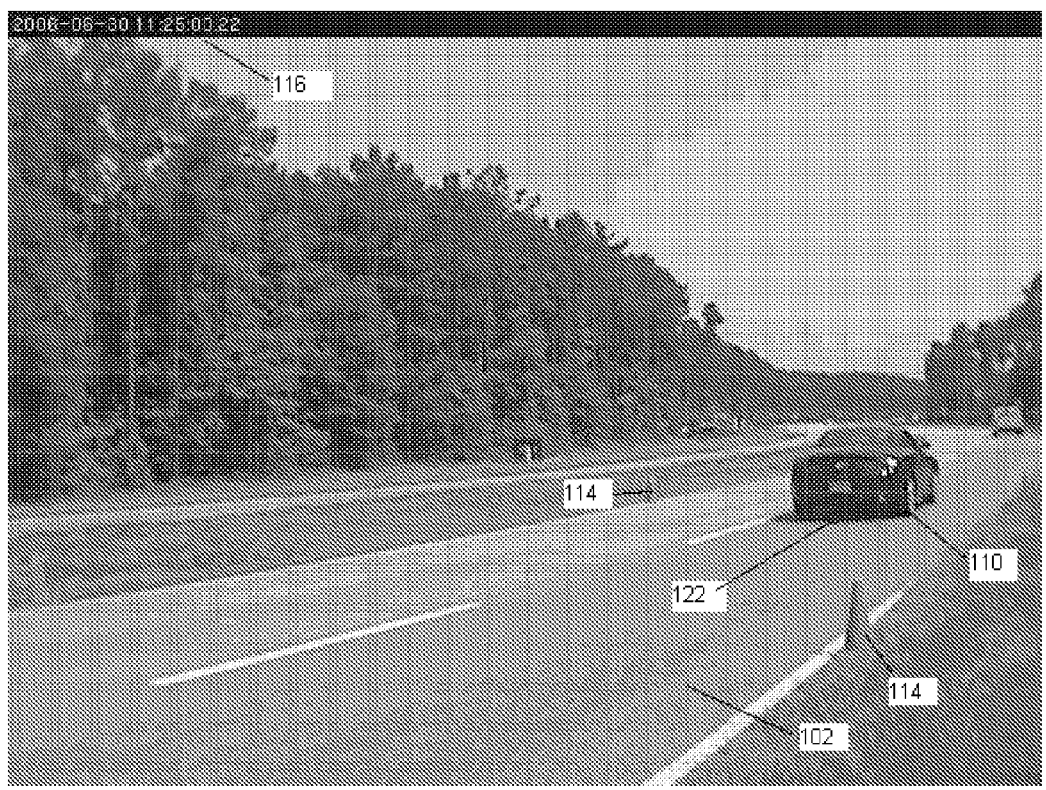
FIG. 8B is an example of an image frame of the vehicle leaving the monitored road segment.

FIGS. 8A-8F illustrate an example of how the average speed of a vehicle 110 can be calculated according to one embodiment. FIGS. 8A and 8B illustrate two image frames showing a vehicle 110 entering and leaving the monitored road segment marked by the four traffic cones 114. FIG. 8A illustrates the frame at which the vehicle 110 enters the monitored rectangular region in full. FIG. 8B illustrates a subsequent frame showing the vehicle 110 approaching the exit of the monitored region. In this example, each frame is accurately time stamped to one one-hundredths of a second. The date and time stamp 116 appears at the upper-left corner of each image frame. In one embodiment, a template-based OCR (optical character recognition) routine is applied to each image to read out its time stamp.

Figure 8C:
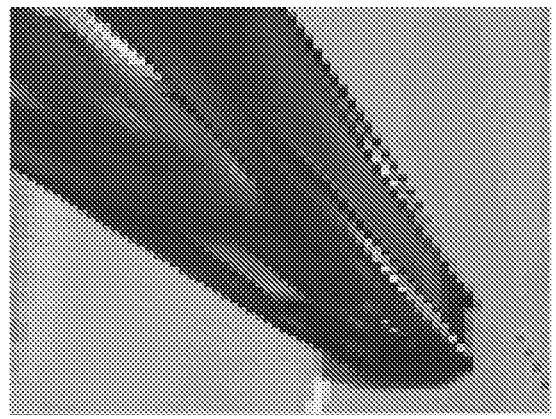
FIG. 8C is a rectified image corresponding to the image frame of FIG. 8A.
Figure 8D:
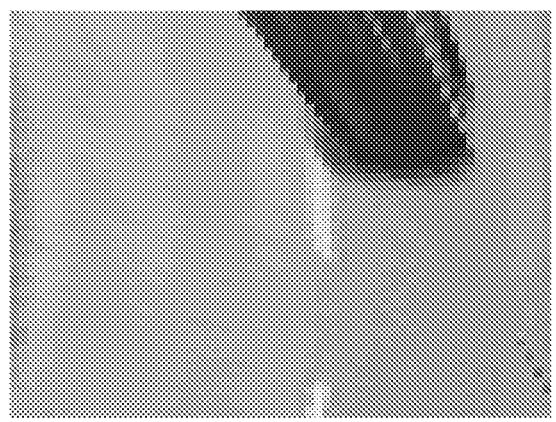
FIG. 8D is rectified image corresponding to the image frame of FIG. 8B.
Figure 8E:
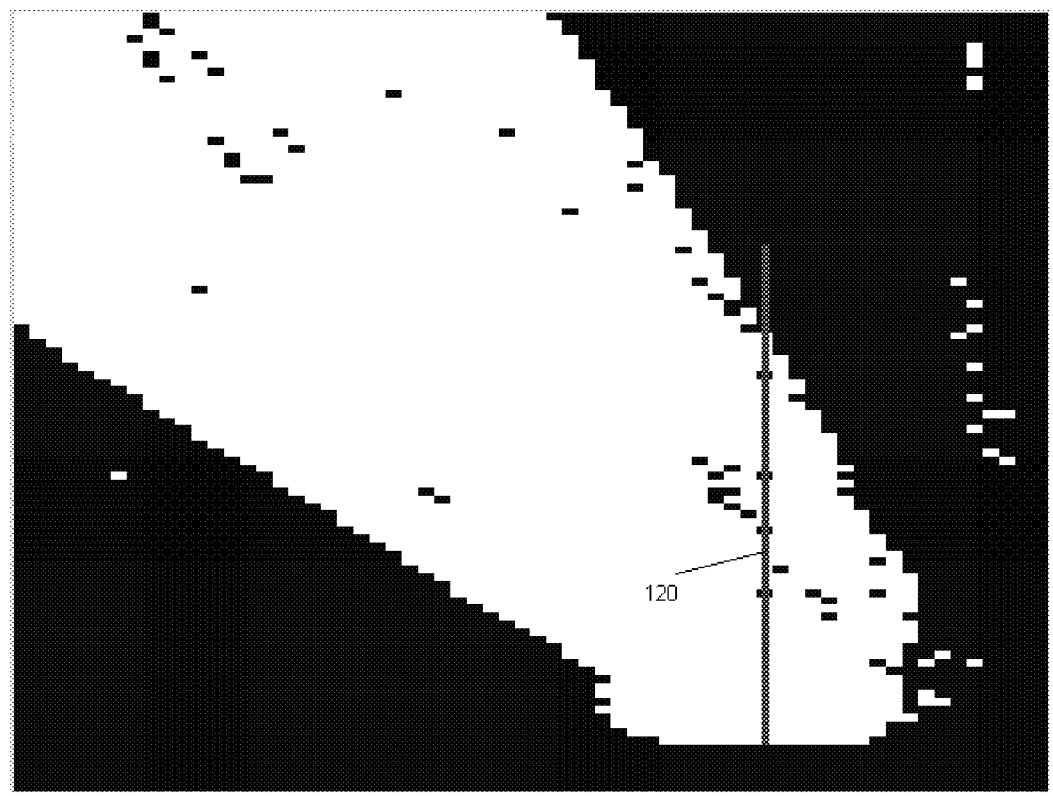
FIG. 8E is an object mask corresponding to the rectified image of FIG. 8C.
Figure 8F:
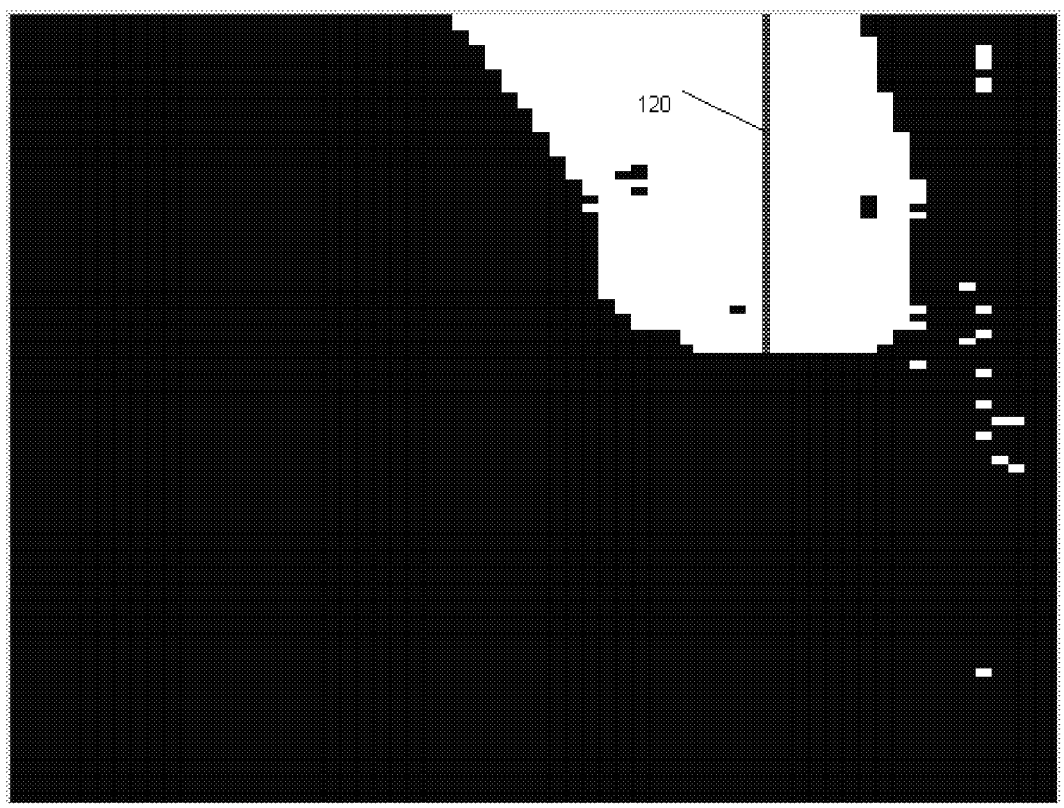
FIG. 8F is an object mask corresponding to the rectified image of FIG. 8D.

FIGS. 8C and 8D illustrate the rectified images of the marked road segment corresponding to the frames shown in FIGS. 8A and 8B, respectively. FIGS. 8E and 8F illustrate the corresponding two-dimensional object masks (for FIGS. 8C and 8D, respectively) with white pixels indicating foreground and black pixels being background. In one example, the reference point, based on which the vehicle's speed is calculated, is chosen to be the bottom of the foreground segments (marked as line segments 120) of the one-dimensional object masks constructed from the two-dimensional object mask images. The real-world coordinates of the reference point can be directly read from its pixel coordinates in the respective object mask images. In the illustrated example, the respective coordinates at the two frames (FIGS. 8A and 8B) are (16, 3) and (16, 29) feet measured relative to the origin. The reference point is mapped back to the original input images and is marked as dots 122 in the two images in FIGS. 8A and 8B.

Figure 9:
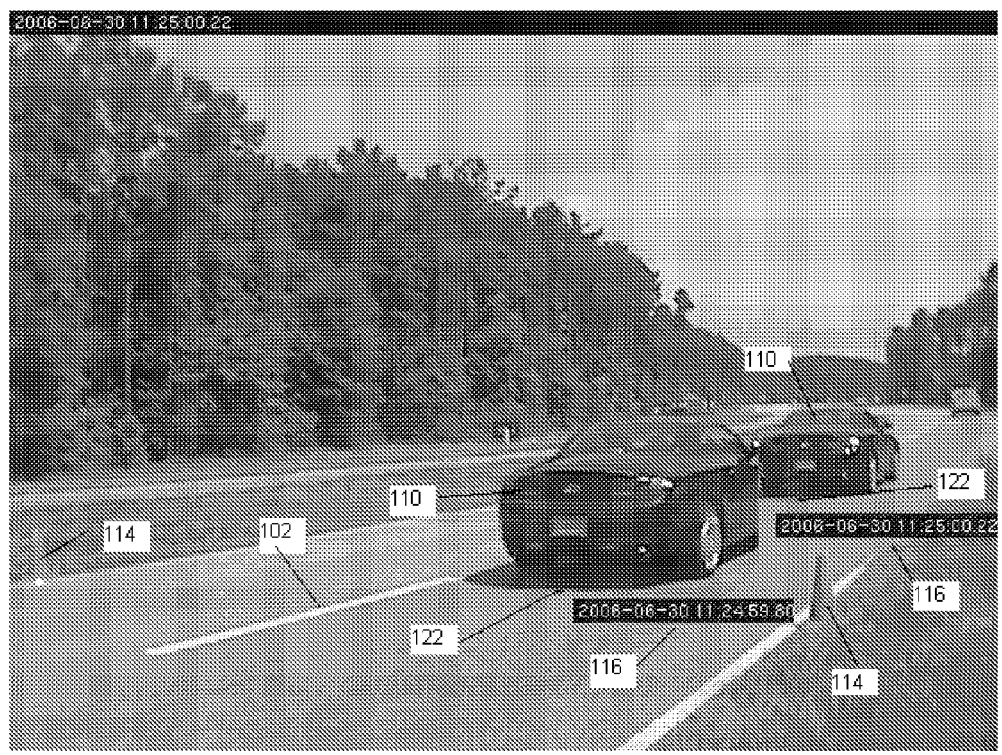
FIG. 9 is an example of a synthesized composite image illustrating how the average speed of the vehicle between the two frames in FIGS. 8A and 8B can be calculated.

Referring to FIG. 9, there is illustrated a synthetic image demonstrating how the average speed of the vehicle may be calculated (step 212). In the illustrated example, the time lapse T between the two frames can be easily calculated from the time stamps:

$$T = 25:00.22 - 24:59.80 = 0.42 \text{ second} \quad (12)$$

The distance D that the vehicle 110 has traveled between the two frames can be calculated from the real-world coordinates of the reference point at the two frames:

$$D = \sqrt{(16-16)^2 + (20-3)^2} = 26 \text{ feet} \quad (13)$$

Therefore, according to equation 11, the average speed V of the vehicle 110 between these two frames can be determined:

$$V = \frac{26 \text{ feet}}{0.42 \text{ second}} = 42.2 \text{ MPH} \quad (14)$$

According to one embodiment, the speed of a vehicle is updated at each frame from when the vehicle is first detected by the system until it exits the monitored zone. At that point, the exit speed of the vehicle may be calculated and compared to the preset trigger speed (step 214) to determine if the vehicle is speeding and, for example, if a citation needs to be issued. In case that the vehicle is speeding and video evidence needs to be collected, the system may calculate the appropriate length of the recording to ensure that the video clip will record the speeding vehicle (step 216) from when the vehicle enters the monitored zone until the vehicle exits the monitored zone. If supplemental enforcement cameras are connected, the system may also trigger the enforcement cameras to take photographs of the vehicle so that registration and/or driver information can be obtained (step 218).

According to one embodiment, to properly associate detected moving vehicles across subsequent image frames, an object matching procedure can be performed to compare image profiles of moving objects across frames. If the profiles are similar enough, it is safe to conclude that they correspond to the same moving vehicle. Otherwise, no association will be established. In another example, to further increase the accuracy of the speed measurements, robust estimation techniques, such as RANSAC, can be applied to the speeds obtained according to Equation 11.

The above description details how the system may detect moving vehicles and calculate their speeds at roadside. As discussed above, if the average speed of a vehicle exceeds the preset trigger speed at the time the vehicle exits the marked zone, a video clip may be recorded from the tracking camera showing the vehicle from entering to leaving the marked zone. Because the system according to embodiments of the present disclosure may measure a vehicle's speed based solely on video frames the system receives from the tracking camera, and all the video frames can be recorded in case of a violation, the system can use the same method to calculate the vehicle speed offline from the recorded video sequence. In this case, according to one embodiment, instead of using live image frames from the tracking camera, the software engine may use the image frames from the recorded video clip to detect vehicles and calculate their speeds. Because the recorded image frames are exactly the same frames that could be used to calculate the vehicle speeds at roadside, the system can reproduce the same speeds for the vehicle whether the calculation is done roadside or at a later time. Therefore, unlike any other speed measuring device, the system according to embodiments of the present disclosure may provide a method for obtaining verifiable vehicle speed information.

Figure 10:
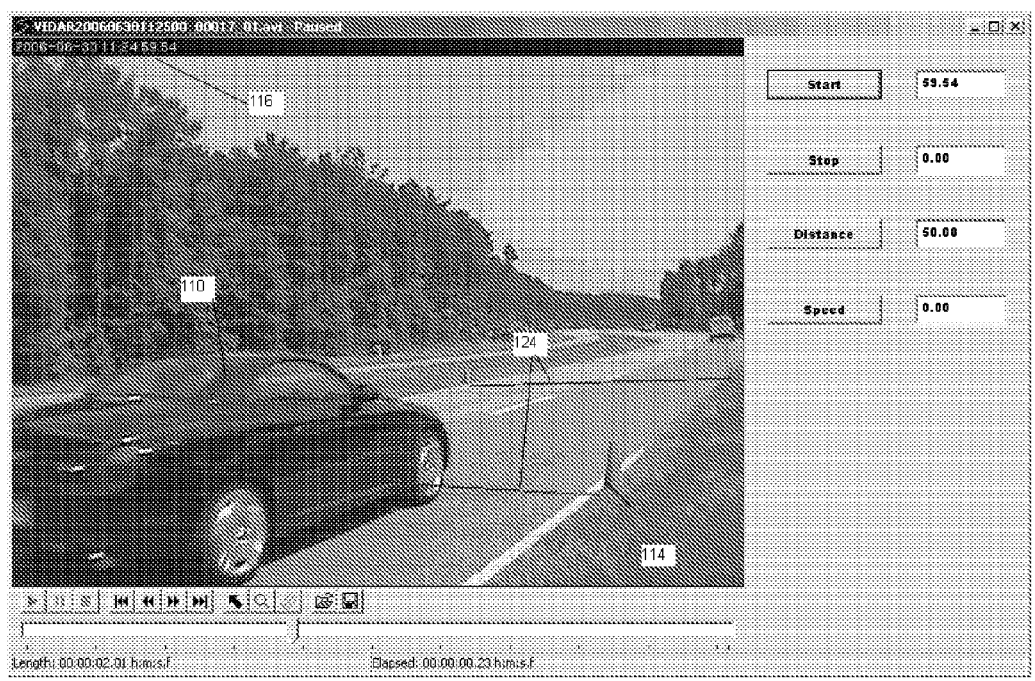
FIG. 10 is an example of a screen shot displayed on a graphical user interface, according to aspects of the present disclosure.
Figure 11:
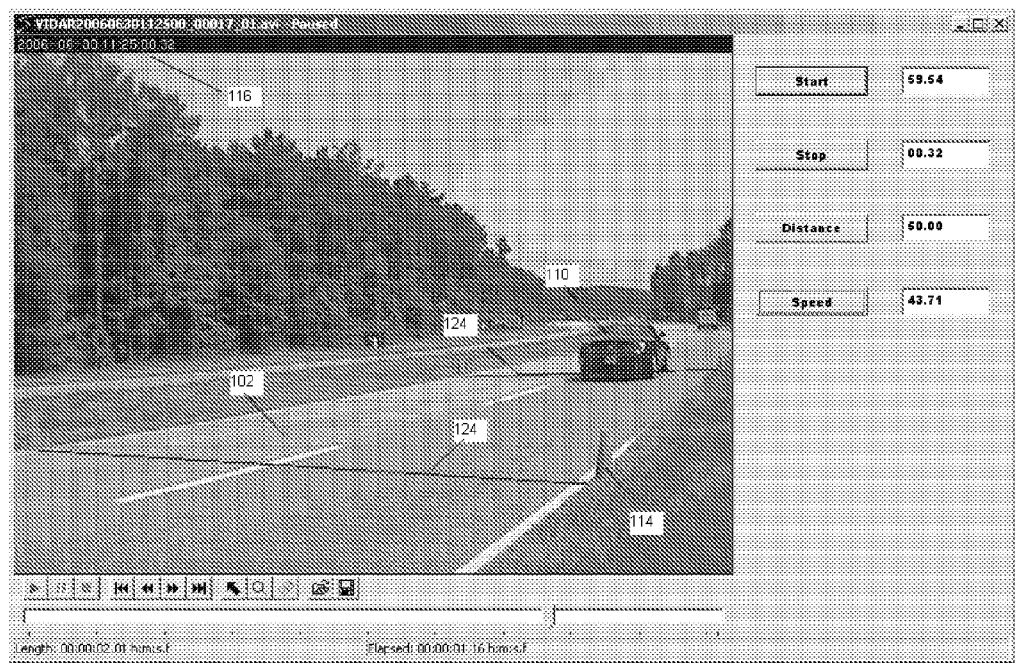
FIG. 11 is another example of a screen shot that, in combination with FIG. 10, illustrates an example of a mechanism for manually verifying vehicle speeds using the time-over-distance method.

In addition, according to another embodiment the system provides a supplemental utility that allows one to manually calculate vehicle speeds from recorded video clips. In one example, this manually calculation is based on the same time-over-distance method used in VASCAR. FIGS. 10 and 11 are example screen shots that may be displayed on a user interface coupled to the system processing unit and illustrate how a vehicle's speed can be calculated using the method and software engine according to aspects of the present disclosure. In the two images, two virtual lines 124 across the road 102 define a pre measured distance along the road within which the speed of the target vehicle 110 may be calculated. When the front tire of the vehicle 110 hits the first line 124, the time $t_1$ can be read from the time stamp 116, which is located at the upper-left corner of the image in FIG. 10. When the front tire of the vehicle 110 hits the second line 124, the time $t_2$ can be read from the time stamp 116 of the image in FIG. 11. Therefore, the vehicle's speed can be simply calculated as:

$$V = \frac{L}{t_2 - t_1} \quad (15)$$

It is also to be appreciated that other reference points, such as the shadow of a vehicle 110, can also be used to measure the speed of the vehicle. In one example, if there is no frame at which the reference point aligns perfectly with one of the two lines 124, an estimate of the vehicle's speed can be obtained in favor of the driver by underestimating the distance or overestimating the time elapse. In addition, in another embodiment, a virtual grid overlay similar to that shown in FIG. 5 can be generated to allow for more accurate speed measurements.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the present disclosure. Accordingly, the foregoing description and drawings are by way of example only.

It will be obvious to those having skill in the art that many changes may be made to the details of the above-described embodiments without departing from the underlying principles of the invention. The scope of the present invention should, therefore, be determined only by the following claims.

What is claimed is:

1. A multiple-object speed tracking apparatus comprising:
   a camera configured to capture a set of images of a monitored area, wherein a longitudinal axis of the camera may be positioned at any viewing angle in relation to a longitudinal axis of a roadway as long the viewing angle allows images of at least two moving objects moving simultaneously within the monitored area to be included in one of either a set of low resolution images or a set of high resolution images;
   a computer system configured to analyze the set of images to detect the at least two moving objects and substantially simultaneously determine a calculated rate of speed of at least one of the two moving objects, wherein the computer system provides an on-site speed calibration process configured to transform locations in an image from the set of images into real-world coordinates by considering, in a single step, both perspective and scale of the image, wherein the computer system includes a homographic calibration process of determining the calculated rate of speed that includes a linear fit comparison of a set of elements related to a distance traveled to an observed time to travel the distance; and
   an apparatus mount upon which at least one of either the camera or the computer system is positioned, wherein the apparatus mount is one of either a fixed mount or a mobile mount.

2. The multiple-object speed tracking apparatus of claim 1:
   wherein the computer system is further configured to compare the calculated rate of speed to a predetermined speed value, and
   wherein the computer system includes a process to ensure better accuracy of the calculated rate of speed by not indicating an object has exceeded the predetermined speed value until determining that a value of a residue of the liner fit does not exceed a preset maximum value of the residue of the linear fit.

3. The multiple-object speed tracking apparatus of claim 2 wherein a set of incident data is generated when the calculated rate of speed exceeds the predetermined speed value.

* * * * *